United States Patent [19]

Kronich

[11] Patent Number: 4,899,704
[45] Date of Patent: Feb. 13, 1990

[54] SELF-LUBRICATING BEARING

[75] Inventor: Peter G. Kronich, Sheboygan, Wis.

[73] Assignee: Tecumseh Products Company, Tecumseh, Mich.

[21] Appl. No.: 348,862

[22] Filed: May 8, 1989

[51] Int. Cl.⁴ .............................................. F01M 1/00
[52] U.S. Cl. ............................ 123/196 W; 123/192 B
[58] Field of Search .......... 123/196 R, 196 W, 192 B; 417/902, 360; 415/90

[56] References Cited

U.S. PATENT DOCUMENTS

| | | | |
|---|---|---|---|
| 2,468,948 | 5/1949 | Smith | 417/360 |
| 2,628,016 | 2/1953 | Higham | 417/902 |
| 3,003,684 | 10/1961 | Tarleton | 417/902 |
| 3,616,786 | 11/1971 | Hatz | 123/196 R |
| 3,712,754 | 1/1973 | Brouwer | 415/90 |
| 3,736,076 | 5/1973 | Ayling | 417/372 |
| 3,794,449 | 2/1974 | Brouwer | 415/90 |
| 3,903,995 | 9/1975 | Irgens | 123/192 B |
| 4,325,679 | 4/1982 | Smith | 417/902 |
| 4,436,490 | 3/1984 | Schonwald | 417/372 |
| 4,662,328 | 5/1987 | Kronich | 123/196 R |
| 4,664,228 | 5/1987 | Hashigaki et al. | 123/192 B |
| 4,741,303 | 5/1988 | Kronich | 123/192 B |
| 4,793,301 | 12/1988 | Ishikawa | 123/192 B |
| 4,800,852 | 1/1989 | Kandler | 123/192 B |

FOREIGN PATENT DOCUMENTS

| | | | |
|---|---|---|---|
| 241662 | 11/1962 | Australia | 123/196 W |
| 159388 | 8/1985 | Japan | 123/196 W |

*Primary Examiner*—E. Rollins Cross
*Attorney, Agent, or Firm*—Albert L. Jeffers; John F. Hoffman

[57] ABSTRACT

The present invention is a self-lubricating bearing for a vertical shaft engine. A stub disposed within the journal bearing has a downwardly facing pocket which propels oil upward by centrifugal force during rotation of the shaft. The upwardly forced oil serves to lubricate the bearing above the stub. The lubrication system can be employed in both stub shaft and through shaft bearings.

25 Claims, 3 Drawing Sheets

SELF-LUBRICATING BEARING

BACKGROUND OF THE INVENTION

The field of the invention is that of lubricating systems for engines. More specifically, the field of the invention is lubricating systems for shaft bearings in vertical shaft engines.

Effective oil lubrication systems for lubricating the working components of an internal combustion engine are necessary to prevent bearing failure and to increase the life of the engine by reducing engine wear. In vertical shaft engines, the bearings for the lower ends of shaft journals must be adequately lubricated. Lubrication systems supply the oil by either a high pressure circulating system or a gravity based sump system.

In a high pressure circulating system, oil circulates within circuits of the system to provide lubrication to each bearing. However, the system of tubing and passageways required for a high pressure system unduly complicates an engine, and greatly adds to its manufacturing cost.

In sump systems, generally oil is splashed or sprayed by displacement pumps and the oil eventually drains back by the force of gravity to an oil pool. The oil pool, or sump, at the bottom of the crankcase provides an oil reservoir for the displacement pumps, but providing displacement pumps requires complex and expensive alterations to the engine design. Also, the lower shaft bearings can be immersed in oil of the sump, so that the oil does not have to be supplied to the bearings by a separate device.

Under normal conditions, when the oil sump is full and the crankcase is level, the immersion lubrication system for shaft journals works correctly. However, if the oil level drops or the crankcase is tilted, often no oil is available for lubricating the bearings. This results from the intake line of the displacement pump being above the oil level position in the crankcase sump. A relatively minor drop in oil level may cause the bearing wall to extend above the oil sump's level, or a tilting may cause the oil to drain into a different part of the engine crankcase.

What is needed to overcome the above problems is an oil lubrication system which provides self-lubrication for shaft bearings. Also needed is a lubrication system which can supply lubrication when the oil sump is at a fractional level or when it is tilted. Yet another need is for a lubrication system which is simple and inexpensive to manufacture.

SUMMARY OF THE INVENTION

The present invention provides a lubricating system having self-lubricating bearings which can lubricate even at low sump oil levels and when the engine is tilted. A stub extension at the lower end of a shaft, such as a counterbalance shaft, is provided with a pocket or recess that functions as a centrifugal pump when the shaft is rotated. Thus, the rotation of the shaft is used as the driving force of a self-lubricating oil flow. A pocket in the stub extension receives oil, which is then urged outwardly by centrifugal force into a feed groove extending upwardly on the stub to an oil feed channel between the bearing and shaft. The lubricating system is easily added to a vertical shaft engine by extending the shaft in the journal bearing, machining the stub extension and providing an appropriately shaped bearing on the crankcase to receive the stub and convey the oil upwardly.

The present invention is a self-contained lubrication system for a vertical shaft journal bearing that is located within the crankcase sump. It serves as a low pressure pump able to supply lubrication to its journal and thrust bearing surfaces. It does not need complicated tubing or passageways, and can adequately provide lubrication to the journal even when the oil level drops below the bottom of the journal. For example, in one embodiment of the present invention, the self-lubricating bearing was able to maintain lubrication when the oil sump was at one-fourth of its normal volume and retained its wet prime on start-up. In performing a dry start-up, that is when no oil is present in the journal, the present invention succeeded in providing lubrication when the oil sump was at half its normal level.

The present invention helps to increase the life of a vertical shaft engine by reducing wear on crankcase journal bearings. The system is self-contained so that no complicated system of passageways or tubing is necessary to maintain the flow of lubricating oil. Further, only minor revisions in tooling are required to provide stub extensions on the shafts and appropriate recesses within the journal bearings of existing engine design.

The present invention, in one embodiment thereof, is a lubrication system for a vertical shaft engine. A crankcase having a sump with lubricating oil has a shaft disposed in a journal bearing of the crankcase. The shaft has a portion disposed within an interior region of the bearing. The bearing has a passage which allows flow of lubricating oil from the sump into the interior region of the bearing, and has a channel facing the shaft. The shaft portion has an axially facing surface with a pocket therein and a groove on its side, which extends from the notch to the shaft. When the shaft portion rotates, oil in the pocket is slung outwardly away from the axis of rotation of the shaft because of centrifugal force. This causes an upward flow of oil in the groove which flows into the channel and from there to the thrust bearing surfaces.

In another embodiment of the invention, the stub extension has a plurality of notches at its lower surface and corresponding grooves. The grooves angularly extend across the side of the stub extension to the shaft in the direction of rotation, with the groove being approximately diagonal. The lower end of the shaft is chamfered, so that in combination with the two notch-groove pairs, the modified stub pumps a greater volume of oil and has improved dry start-up ability.

An object of the present invention is to provide a self-contained oil lubricating system within a shaft bearing.

Another object of the present invention is to provide a lubrication system capable of providing lubricating oil to the bearing in the case of reduced oil levels or tilted crankcase.

Still another object of the present invention is to provide a lubrication system which requires no additional components and only minor revisions in tooling to incorporate into existing engine design.

BRIEF DESCRIPTION OF THE DRAWINGS

The above mentioned and other features and objects of this invention and the manner of attaining them will become more apparent and the invention itself will be better understood by reference to the following description of an embodiment of the invention taken in conjunction with the accompanying drawings.

Corresponding reference characters indicate corresponding parts throughout the several views of the drawings.

The exemplifications set out herein illustrate preferred embodiments of the invention, in two forms thereof, and such exemplifications are not to be construed as limiting the scope of the disclosure or the scope of the invention in any manner.

DESCRIPTION OF THE PREFERRED EMBODIMENT

Figure 1:
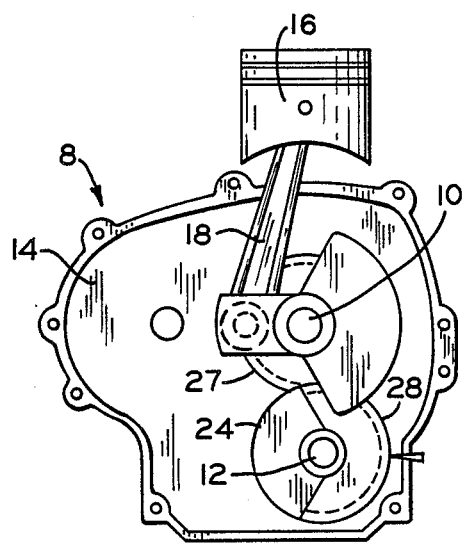
FIG. 1 is a top plan view of a counterbalanced internal combustion engine.

Referring to FIG. 1, engine 8 includes an inline counterbalance weight system having self-lubricating bearings of the present invention. Crankshaft 10 and counterbalance shaft 12 are disposed within crankcase 14 and piston 16 drives crankshaft 10 by movement of connecting rod 18. An inline counterbalance weight system compatible with the present invention is described in U.S. Pat. No. 4,800,852 and is incorporated by reference herein.

Figure 2:
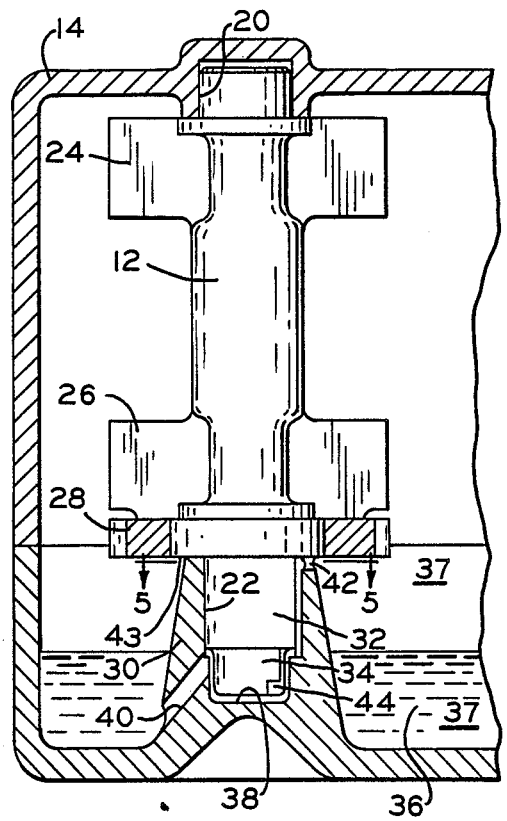
FIG. 2 is an enlarged sectional view of the crankcase and counterbalance shaft equipped with the present invention.

FIG. 2 shows counterbalance shaft 12 disposed within upper and lower journal bearings 20 and 22, respectively, of crankcase 14. Disposed on counterbalance shaft 12 between bearings 20 and 22 are upper counterbalance weight 24, lower counterbalance weight 26, and counterbalance drive gear 28 which is below both counterbalance weights 24 and 26 and is driven by gear 27 connected to crankshaft 10. Located below counterbalance drive gear 28 is bearing wall 30, which receives shaft journal 32 and stub extension 34 of shaft 12. In an exemplary embodiment, journal 32 is approximately 0.75 inches long and stub extension 34 is approximately 0.5 inches long. Oil sump 36 is shown in FIG. 2 with the oil 37 at its full level which extends above the top of wall 30, providing lubricating oil to interior region or annual chamber 38 of bearing 22 via passage 40 and passage 42. The lubrication system of the present invention pumps lubricating oil from passage 40 to passage 42, thus lubricating bearing 22 and thrust bearing 43.

Figure 3:
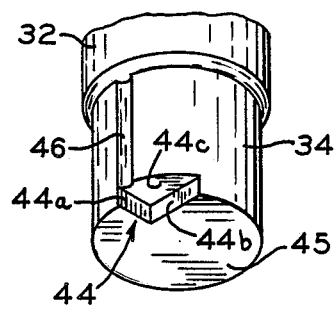
FIG. 3 is a perspective view of the stub extension of the counterbalance shaft.
Figure 4:
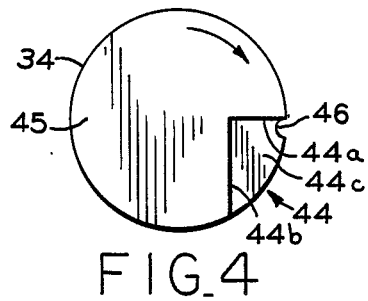
FIG. 4 is an end view of the stub extension.
Figure 6:
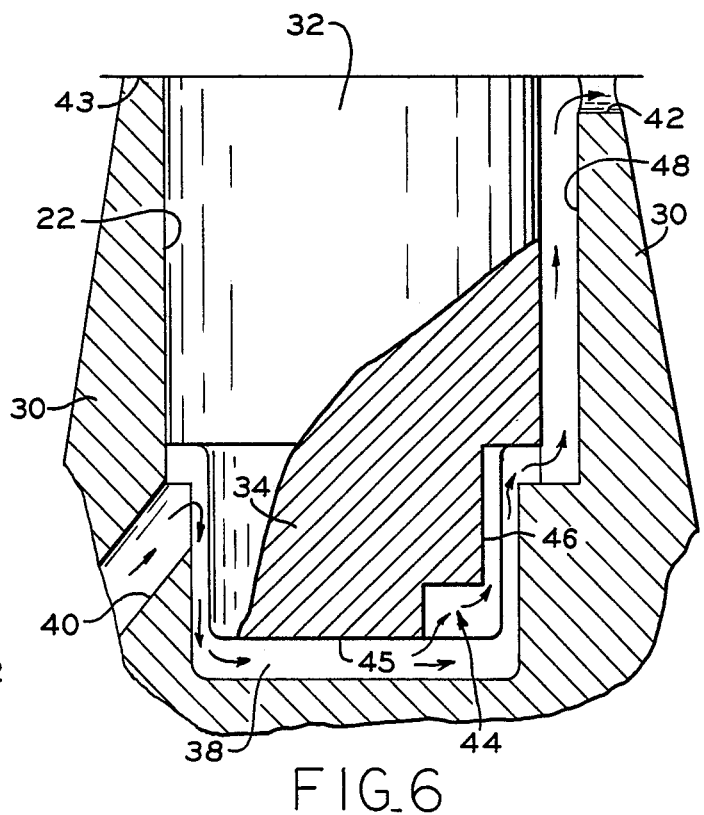
FIG. 6 is an enlarged fragmentary longitudinal sectional view of the journal bearing and oil pump of the present invention.

Lower journal bearing 22 is shown in more detail in FIG. 6. Stub extension 34 has a notch or pocket 44 on its lower face 45. In the preferred embodiment, notch 44 has a depth of approximately 0.09 inches and a width, measured from the outer circumference inwardly along the radius, of approximately 0.125 inches. Extending across the outer circumference of stub extension 34 from notch 44 to shaft journal 32 is a half-circle shaped feed groove 46. The shape of notch 44 and groove 46 can be seen in FIGS. 3 and 4.

Notch 44 is defined by side walls 44a and 44b and upper surface 44c. Side wall 44a is perpendicular to the tangent of the circumference of stub 34, side wall 44b is parallel to lower wall 44a, and upper surface 44c is relatively parallel to lower axially facing surface 45. Stub 34 rotates in a clockwise direction in the embodiment shown in FIG. 4, and wall 44a faces the direction of rotation to positively urge oil flow in an outward radial direction.

Figure 5:
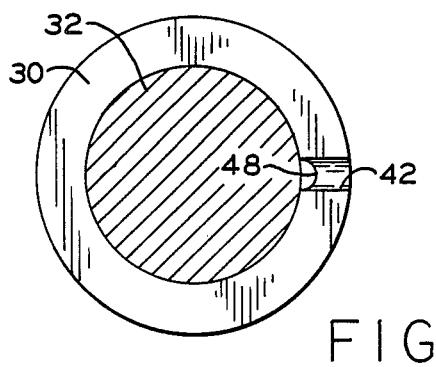
FIG. 5 is a transverse sectional view taken along line 5—5 of FIG. 2 viewed in the direction of the arrows.

Bearing wall 30 has a feed channel 48 facing shaft journal 32 from below the lowest point of journal 32 to bearing passage 42, which is a small hollow formed on the upper edge of wall 30 (FIGS. 5 & 6). The outer surfaces of stub 34 are spaced from wall 30 and crankcase 14 to define annular chamber 38, and passage 40 connects chamber 38 to oil sump 36. Passage 40, interior region 38, feed channel 48, and bearing passage 42 provide the lubricating oil a path to traverse from oil sump 36 through lower journal 22 and back to oil sump 36. By this path, lubricating oil can be applied to bearings 32 and 43 even when oil sump 36 is as low as one-fourth full.

In operation, the self-lubricating bearing rotates by the motion of counterbalance drive gear 28 driving counterbalance shaft 12. As the counterbalance shaft 12 rotates so does stub extension 34. Oil within pocket 44 is forced outwardly from the axis of rotation of counterbalance shaft 12 because of centrifugal force. The oil moving out of pocket 44 moves outwardly against wall 30 and at that point moves into feed groove 46. At the top of feed groove 46, the oil is directed outwardly towards wall 30 into feed channel 48. Oil flows upwardly in channel 48 to lubricate journal bearing 22 and thrust bearing 43 (FIG. 2), and then flows outwardly through opening 42 in wall 30 whereupon it is returned to sump 36. From oil sump 36, the oil is drawn into passage 40 to reenter interior region 38. The level of oil sump 36 need only be to the height of the intake of passage 40, rather than the top of lower bearing 22 as is the case in immersion lubrication.

Figure 7:
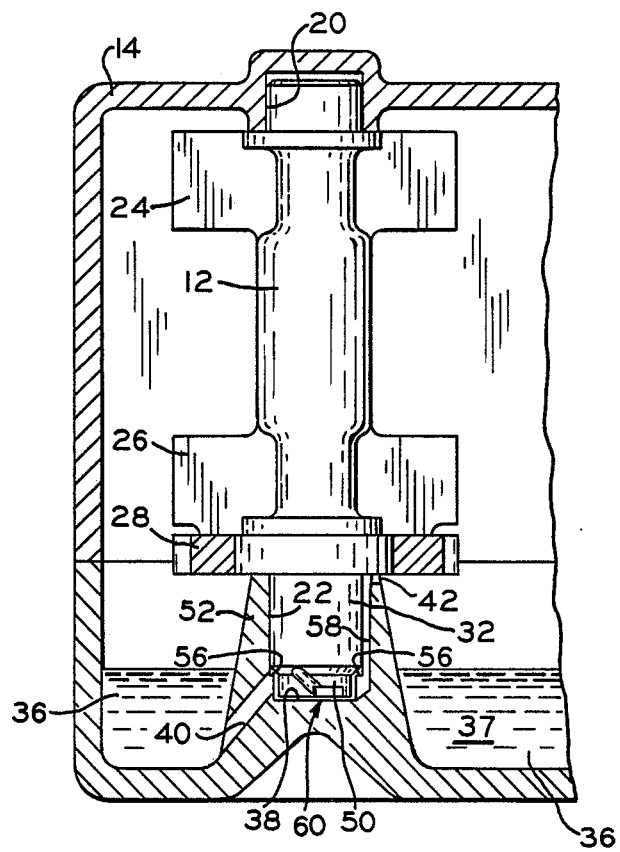
FIG. 7 is a longitudinal sectional view of a crankcase and counterbalance shaft equipped with an alternate embodiment of the present invention.
Figure 8:
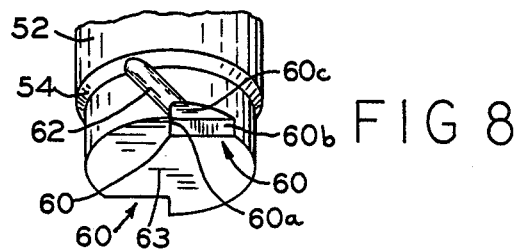
FIG. 8 is a perspective view of the stub extension of the alternate embodiment of FIG. 7.
Figure 9:
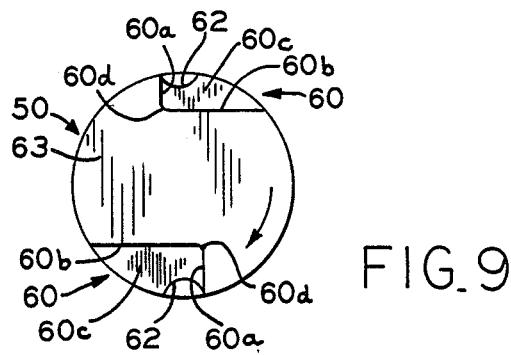
FIG. 9 is an end view of the stub extension of the alternate embodiment.

An alternative embodiment of the present invention is depicted in FIGS. 7, 8, and 9. Stub extension 50 is approximately 40% as long as stub extension 34 and slightly smaller in diameter, although bearing 52 is approximately the same length as journal 32. In this embodiment, stub extension 50 is approximately 0.2 inches in height and 0.625 inches in diameter, with bearing 52 having a diameter of approximately 0.7485 inches.

Chamfered shoulder or rim 54 circumferentially faces annular shoulder 56, which has a diameter greater than that of stub extension 50 and less than that of bearing 52. Lower bearing 22 also has an elongated feed channel 58 which extends from the bottom of stub extension 50 to the top of wall 30.

Stub extension 50 has two pair of pockets 60 and feed grooves 62 disposed on opposite sides of its lower face 63. To compensate for the shorter height of stub extension 50, feed grooves 62 are angled with the rotation of stub extension 50 at approximately 45 degrees from the plane defined by the bottom of stub extension 50; and feed grooves 62 extend to a maximum length which includes a section within shoulder 54. Pockets 60 have a width, measured from the outer circumference inwardly along a line defined by sidewall 50b, of approximately 0.125 inches and a depth of approximately 0.09 inches.

Pockets 60 are defined by side walls 60a and 60b and upper surface 60c. Side wall 60a is relatively parallel to a radius of stub 50 which is perpendicular to side wall 60b, side wall 60b is relatively perpendicular to side wall 60a, and upper surface 60c is relatively parallel to lower face 63. The intersection of walls 60a and 60b forms a curved corner 60d rather than a right angle. When stub 50 rotates in a clockwise direction in the embodiment shown in FIG. 9, wall 60a faces the direction of rotation.

The operation of the alternate embodiment depicted in FIGS. 7-9 is similar to that of the preferred embodiment. Stub passage 40, interior region 38, feed channel 58, and passage 42 provide the lubricating oil a path to flow from sump 36 through lower journal bearing 22 and back to oil sump 36. With two pockets 50 and grooves 52, this embodiment increases the volume of oil pumped and improves its dry pumping ability.

In addition to pumping lubricating oil for the bearing which the stub extension is attached to, the present invention can also supply lubricating oil to an adjacent position, such as an adjacent bearing. If the invention is applied to an intermediate portion of a shaft disposed in a journal bearing, it is necessary for the shaft to be undercut immediately below pocket 44 so that oil can be drawn into pocket 44 and pumped upwardly. Although the invention is shown applied to a shaft in an internal combustion engine, it could alternatively be applied to other shafts in a power train, such as in a transmission or transaxle.

Figure 10:
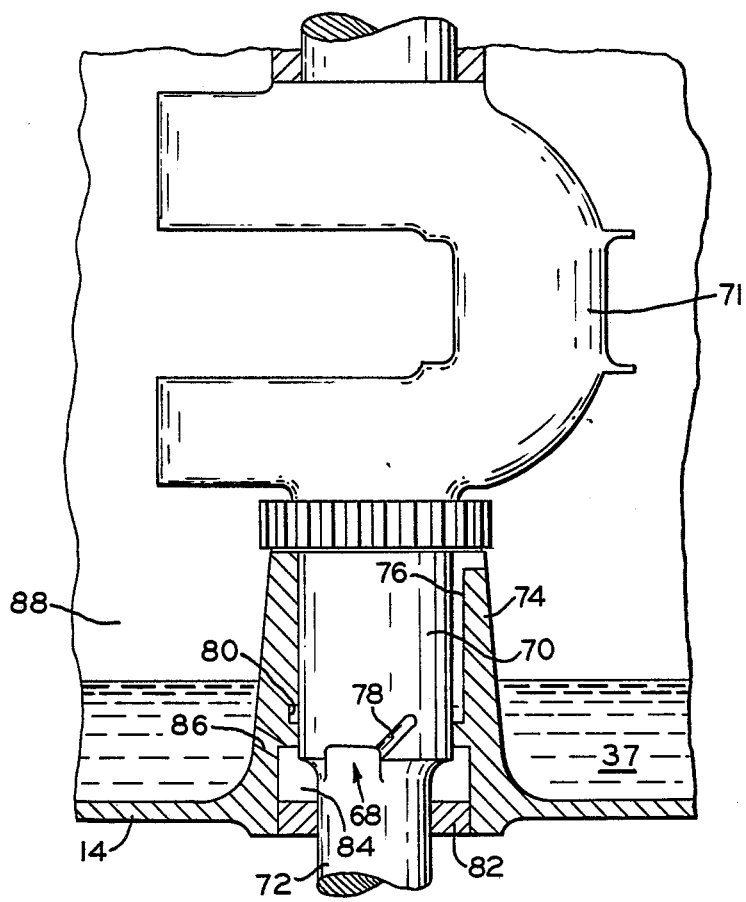
FIG. 10 is an enlarged sectional view of a crankcase and crankshaft equipped with the present invention.

Referring to FIG. 10, lubrication of the crankshaft bearing is shown. An oil pocket 68 is recessed within an axially facing portion of journal 70, which is disposed below crank 71 of crankshaft 72. Oil traversing to feed channel 76 flows through feed groove 78, which extends across the outer surface of journal 70 at approximately a 45° angle, extending to feed channel 76. More than one pocket-groove pair is possible on journal 70, with available space and pumping requirements determining the number of pocket-grooves. Journal 70 has an annular oil receiving channel 80 in communication with groove 78. Channel 80 is located at the bottom of feed channel 76 and provides a path for oil to flow during the entire rotation of crankshaft 72. Since crankshaft 72 extends outside crankcase 14, seal 82 is provided and defines an interior region 84. Oil enters interior region 84 via oil passage 86 from oil sump 88, creating an oil reservoir for pocket 68 to pump oil up feed channel 76 in a manner similar to that described above.

Figure 11:
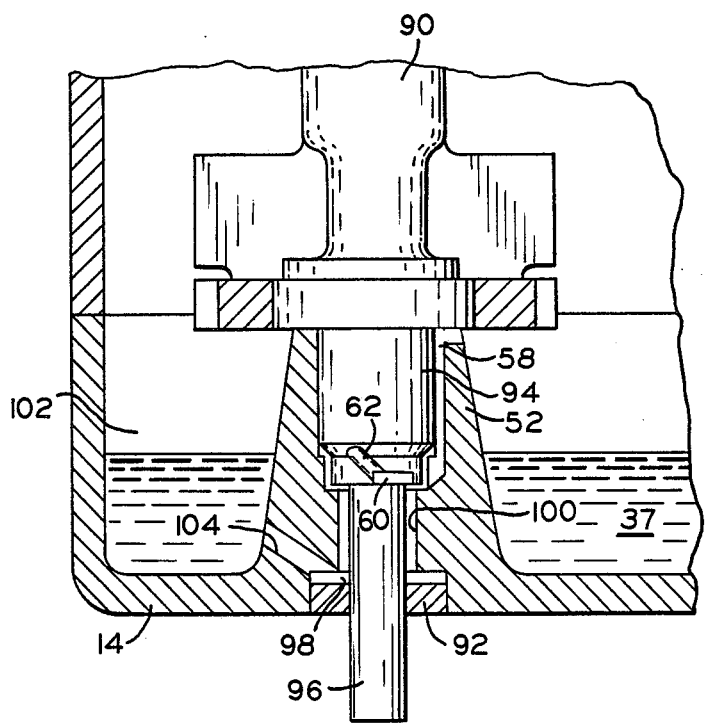
FIG. 11 is an enlarged sectional view of the present invention used with a counterweight shaft extending outside the crankcase.

Referring to FIG. 11, counterweight shaft 90 extends outside crankcase 14 to serve as a power take-off and is sealed by seal 92. Journal 94 of shaft 90 is located within bearing 52. At the end of journal portion 94 is stub extension 50, which in combination with bearing 52 has a similar configuration to FIG. 7 and further includes an additional shaft extension 96 located at the end of the lower facing surface. An interior region 98 is formed by seal 92, an annular shaft receiving recess 100, and shaft 90; interior region 98 provides an oil reservoir, in communication with oil sump 102 via passage 104, which provides oil for extension 50 to pump oil in a manner similar to that described above.

Although the self-lubricating bearing of the present invention has been described as having a preferred design, it can be further modified within the teachings of this disclosure. This application is therefore intended to cover any variations, uses, or adaptations of the invention following its general principles. This application is also intended to cover departures from the present disclosure as come within known or customary practice in the art to which this invention pertains and fall within the limits of the appended claims.

What is claimed is:

1. An engine comprising:
   a crankcase having a sump region;
   a journal bearing in said crankcase;
   a shaft having a portion thereof disposed within an interior region of said journal bearing;
   said journal bearing having a passage extending into said sump to allow passage of oil from said sump to said interior region;
   said shaft portion having an axially facing surface disposed in said interior region of said bearing in communication with oil therein; and
   an oil channel between said journal bearing and said shaft;
   said shaft portion having a pocket in its outer circumferential surface at said axially facing surface and a groove on said outer circumferential surface extending from said pocket to said shaft such that when said shaft portion rotates, oil in said pocket is pumped through said groove to said channel to lubricate said journal bearing.

2. The engine of claim 1 wherein said shaft portion is a stub extension of said shaft and said axially facing surface is an axial end of said shaft.

3. The engine of claim 2 wherein said passage has an intake near the bottom of said sump.

4. The engine of claim 2 including an opening in said journal bearing in communication with said journal channel providing an outlet from said journal channel to said sump.

5. The engine of claim 2 wherein said channel extends axially along said bearing to provide a passage for lubricating oil.

6. The engine of claim 2 wherein said pocket is defined by a first and second side wall and an upper surface, said first side wall being substantially relatively perpendicular to said second side wall.

7. The engine of claim 6 wherein said upper surface is substantially parallel to said end surface of said stub extension.

8. The engine of claim 7 wherein said first side wall is substantially colinear with a radius of said stub extension.

9. The engine of claim 8 wherein said first side wall faces in the direction of rotation of said stub extension.

10. The engine of claim 1 wherein said engine is a vertical crank engine and said shaft is vertically oriented.

11. A vertical crank engine comprising:
    a crankcase having a sump region;
    a shaft disposed within a journal bearing of said crankcase;
    a stub extension on a lower end of said shaft and disposed within an interior region of said journal bearing; and said journal bearing having a passage extending into said sump to allow passage of oil from said sump to said interior region and having a channel facing said shaft;

said stub extension having a plurality of pockets in its outer circumferential surface at its lower surface and a plurality of corresponding grooves on said outer circumferential surface, each said groove extending from said corresponding pocket to said shaft such that when said stub extension rotates, oil in said pocket is pumped through said groove to said channel to lubricate said journal bearing.

12. The engine of claim 11 wherein said shaft has a chamfered rim on a lower end of said shaft.

13. The engine of claim 12 wherein said journal bearing has a shoulder located on an inner wall, said rim facing said shoulder, and said shoulder has a diameter greater than said stub extension and less than said shaft.

14. The engine of claim 11 wherein said grooves are positioned at an acute angle relative to the plane defined by a lower surface of said stub extension.

15. The engine of claim 11 wherein said passage has an intake near the bottom of said sump.

16. The engine of claim 11 wherein said pockets are defined by a first and second side wall and an upper surface, said first side wall being substantially relatively perpendicular to said second side wall.

17. The engine of claim 16 wherein said upper surface is substantially parallel to a bottom surface of said stub extension.

18. The engine of claim 17 wherein said first side wall faces in the direction of rotation of said stub extension.

19. The engine of claim 18 wherein a junction of said first side wall and said second side wall form a curved corner.

20. The engine of claim 11 wherein said stub extension has two said pockets and two said grooves.

21. A power train apparatus comprising:
a housing having a sump region;
a shaft having a portion thereof disposed within an interior region of a journal bearing of said housing;
said journal bearing having a passage extending into said sump to allow passage of oil from said sump to said interior region;
said shaft portion having an axially facing surface disposed in said interior region of said bearing in communication with oil therein; and
an oil channel between said journal bearing and said shaft;
said shaft portion having a pocket in its outer circumferential surface at said axially facing surface and a groove on said outer circumferential surface extending from said pocket to said shaft such that when said shaft portion rotates, oil in said pocket is pumped through said groove to said channel to lubricate said journal bearing.

22. The apparatus of claim 21 wherein said shaft portion is a stub extension of said shaft and said axially facing surface is an axial end of said shaft.

23. The apparatus of claim 22 including an opening in said journal bearing in communication with said journal channel providing an outlet in said journal channel to said sump.

24. The apparatus of claim 22 wherein said channel extends axially along said bearing to provide a passage for lubricating oil.

25. The apparatus of claim 21 further comprising an annular channel located between said journal bearing and said shaft at a lower end of said oil channel for receiving oil from said groove at every point of the rotation of said shaft.

* * * * *